United States Patent Office 3,740,237
Patented June 19, 1973

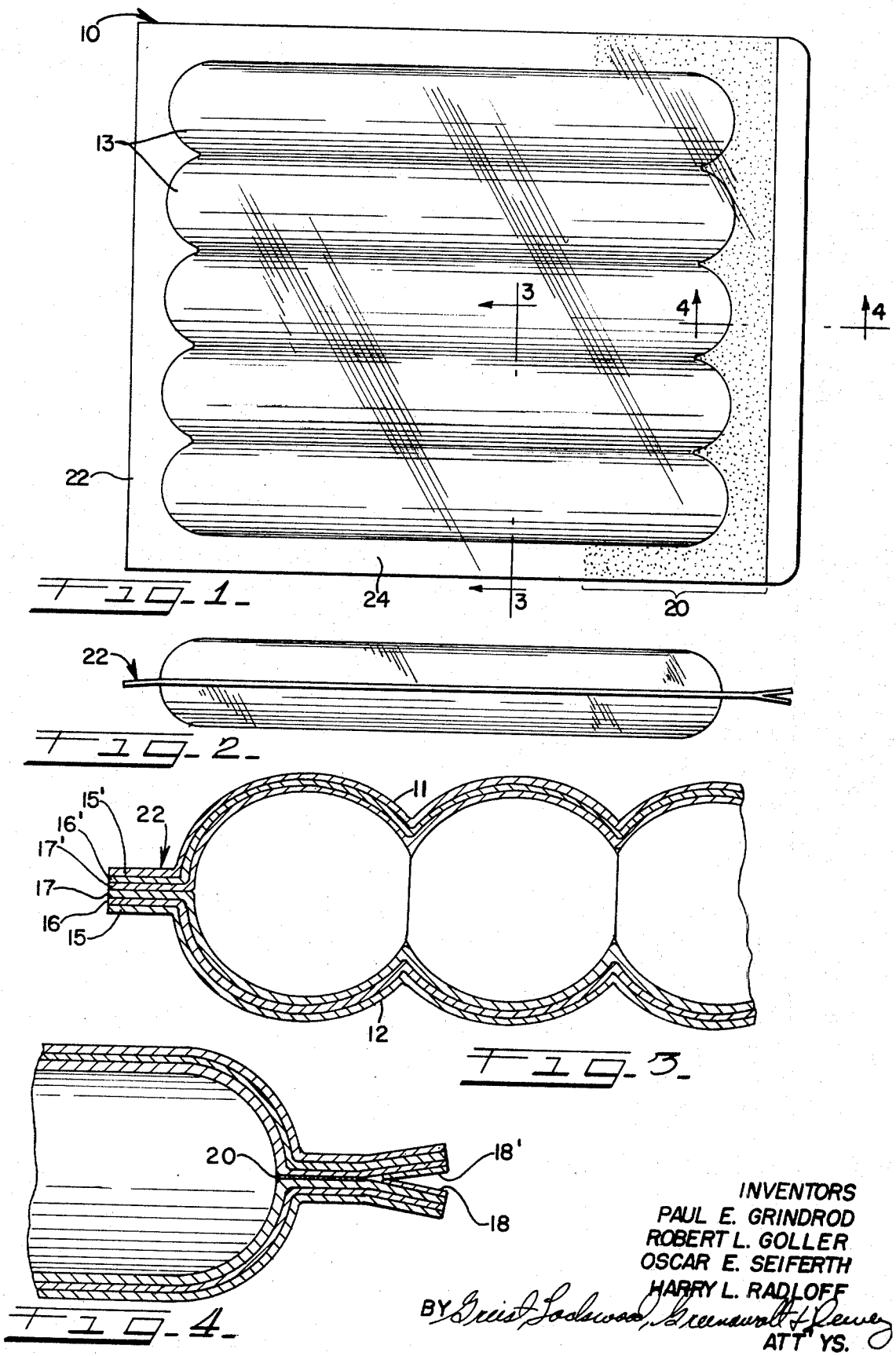

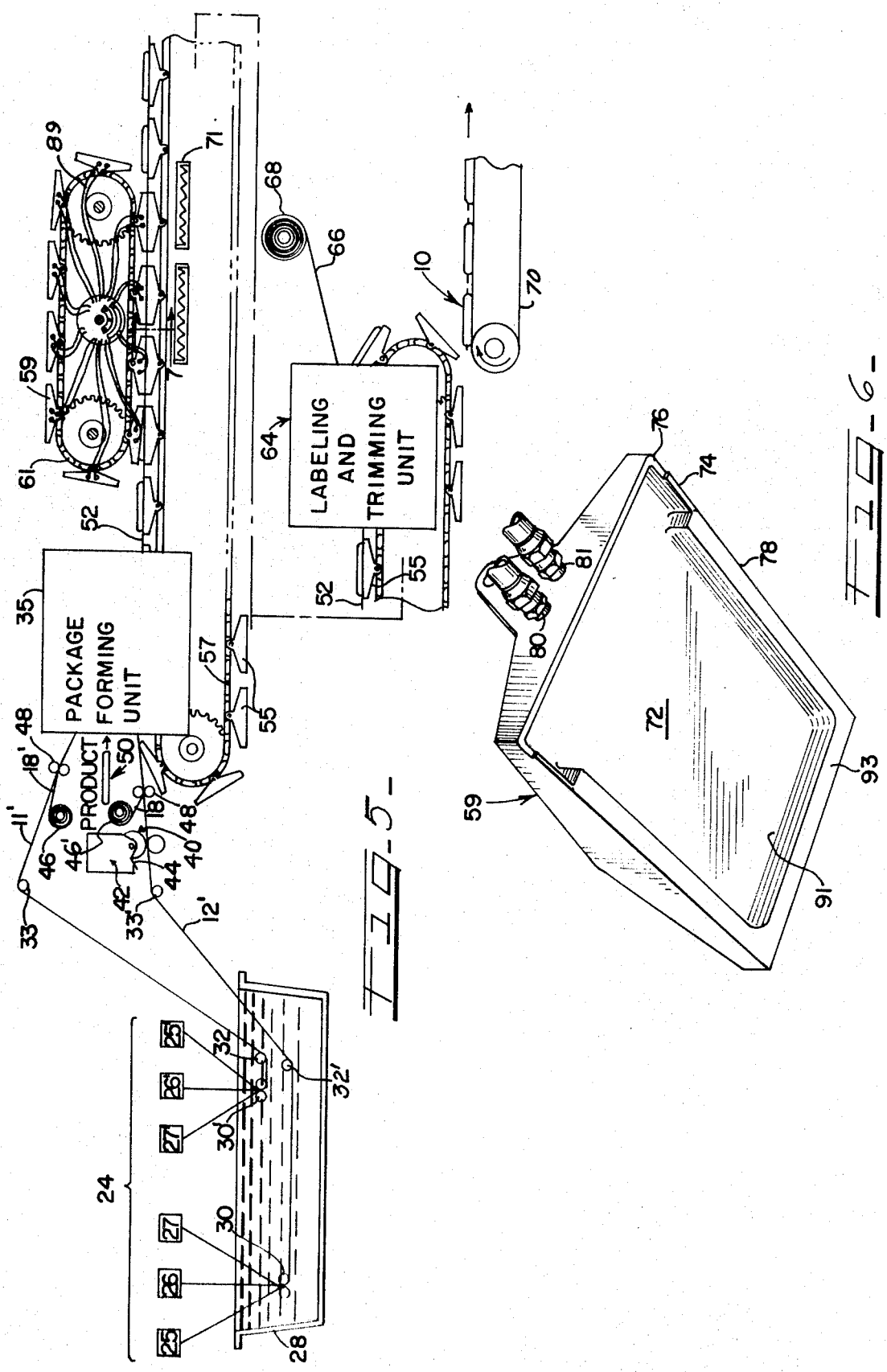

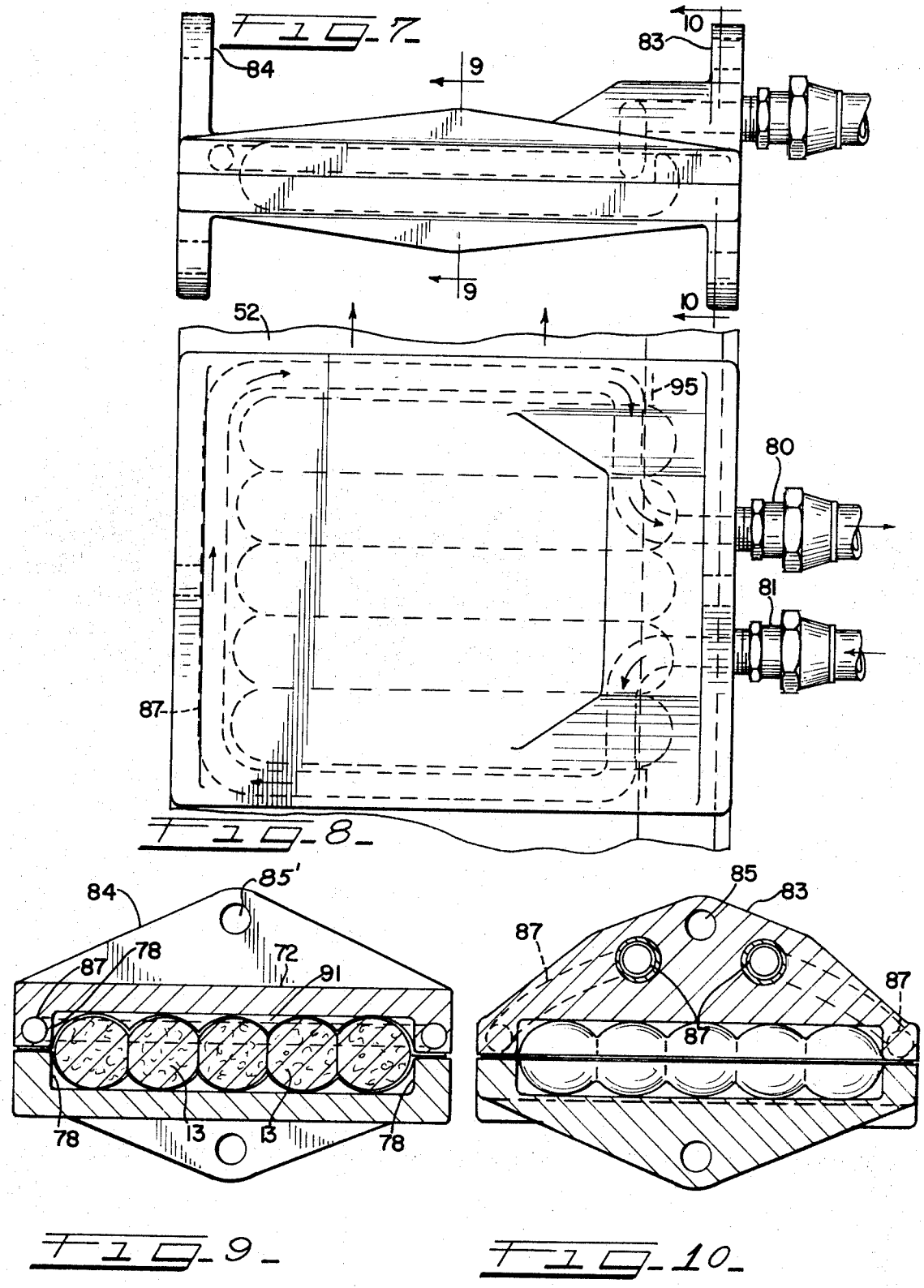

3,740,237
CONTINUOUS METHOD FOR MANUFACTURING HERMETICALLY SEALED PACKAGES HAVING DUAL SEALS
Paul E. Grindrod and Robert L. Goller, Madison, Harry L. Radloff, Sun Prairie, and Oscar E. Seiferth, Madison, Wis., assignors to Oscar Mayer & Company, Inc., Madison, Wis.
Filed Nov. 25, 1970, Ser. No. 92,560
Int. Cl. B65b 51/02
U.S. Cl. 99—171 S
8 Claims

ABSTRACT OF THE DISCLOSURE

A continuous method of enclosing a product between a pair of films so as to provide a package having a product enclosing portion and a peripheral flange. The pair of films are joined to form a hermetic, dual seal, by applying a continuous strip of peelable bond adhesive thru a portion of the film destined to become a peripheral flange and extending partially into that portion of the film destined to become the product enclosing portion and providing the remainder of the peripheral flange with means for permanently bonding the pair of films.

---

The use of thin formable films of packaging material in the continuous high speed manufacture of product-formed packages is becoming increasingly important in the packaging of food products and the like. In the manufacture of such packages, the product is enclosed between two usually transparent, layers of packaging material, one or both of the layers being formed by the product itself, usually by vacuum-forming techniques. The sheets of packaging material meet at an interface which provides a hermetic seal area completely surrounding the product.

It has been suggested that the hermetic seal be a film-to-film seal, and, indeed, the use of such a permanent seal provides a highly efficacious structurally stable hermetic package. Such packages are usually opened by initiating a tear at a notch provided in the side of the package. Of course, once the package is torn open to gain access to the contents, it is impossible to reseal to protect the unused portion of the contents of the package from atmospheric-caused deterioration.

It has also been suggested that the hermetic seal be a peelable bond. Such a peelable bond can be provided by proper selection of materials for innermost surfaces or lamina which abut in the seal area. The natural adhesion between properly selected materials is great enough to hermetically seal the enclosure, and yet is sufficiently low in bond strength to permit reseparation of the innermost lamina by peeling. Alternatively, properly selected adhesives are used to provide the same characteristics at the peelable hermetic seal.

Due to the relatively low bond strength of some peelable interface seals, and because of the rather rough treatment to which the flexible packages are subjected in some areas, it has not been uncommon in such areas for at least a small percent of the readily peelable seals to be opened during the normal distribution and display of the products prior to retail sale. For example, packages of weiners arranged side by side in a plane and sealed between two layers of flexible vacuum-formed plastic, which are sealed around the entire periphery of the contents, are somewhat flexible, and a low bond strength peelable seal is sometimes subject to separating forces along the longer edges of the package due to rough twisting of the package.

Since many film-product packages are product-formed, another problem commonly encountered in those packages having a low strength peelable seal joining two layers of film comprising the package resulted from dislodging articles from their closely fitting seat. For example, a housewife, desiring to remove several weiners from a fresh package sometimes completely separated the respective layers which comprise the package. Since the sheets of plastic are conventionally product-formed, the sheets are shaped to closely conform to the contents. Hence, when the two layers were completely separated inadvertently, the layers were virtually impossible to re-join to hermetically enclose the product.

It is an object of this invention to provide a novel film-product package in which the product is enclosed between two layers of packaging material which are joined to form a hermetic seal completely around the periphery of the package, the hermetic seal being a dual seal, a portion of which is film-to-film bond (i.e., a permanent bond), the remainder of which is a peelable, resealable bond.

It is a further object of this invention to provide a package which includes a resealable mouth portion, and which facilitates removal of a portion of the contents from the package, without disturbing the remaining contents to such an extent that it becomes possible to reclose the package to hermetically reseal the remaining product. It is another object of the invention to provide a novel method for the manufacture of such a package utilizing a dual-seal, which method is readily adaptable to high speed continuous manufacture of the package-product from "continuous" sheets of the packaging material.

It is a further object of this invention to provide a method of manufacture of the novel dual seal package, which method assures the absence of capillary leakage along the lines where the peelable seal meets the film-to-film seal.

These and other objects which will be apparent hereinafter are all accomplished in accordance with this invention which is described in detail and its broader aspects hereinafter and in the accompanying drawings in which:

FIG. 1 is a plan view illustrating a preferred film-product package in accordance with this invention.

FIG. 2 is an elevational side view of the package illustrated in FIG. 1.

FIG. 3 is an enlarged fragmentary cross-sectional elevational view taken approximately along the line 3—3 of FIG. 1.

FIG. 4 is an enlarged fragmentary cross-sectional elevational view taken approximately along the line 4—4 of FIG. 1.

FIG. 5 is a schematic elevational view illustrating the overall manufacturing process step sequence.

FIG. 6 is a perspective view showing a U-shaped heating bar built into a product-enclosing unit illustrated in FIG. 5.

FIG. 7 is an elevational view taken approximately along the line 7—7 in FIG. 5 showing only two halves of a single product-enclosing sealing unit.

FIG. 8 is an enlarged fragmentary plan view of the heat sealing unit of FIG. 7.

FIG. 9 is a cross-sectional elevational view taken approximately along the line 9—9 of FIG. 7.

FIG. 10 is an elevational cross-sectional view taken approximately along the line 10—10 of FIG. 7.

FIGS. 1 through 4 illustrate a weiner package 10 which is formed by the shaping and sealing of laminated film. For purposes of illustrating the present invention, package 10 includes a top laminate 11 and a bottom laminate 12 which cooperatively enclose therebetween a plurality of weiners or weiner type products 13, these products being placed in side by side relation. It will be appreciated however that the present invention is equally suitably used in the packaging of other products, such as, for example, sliced luncheon meats, cheese, and the like. The laminates 11 and 12 are combined peripherally about the products 13 to form a continuous edge seal. Laminates are also drawn inwardly about the product to conform to the contour thereof. By reason of the laminates 11 and 12 intimately engaging and surrounding the products 13 and conforming to the shape thereof, the package 10 is adequately rigid for efficient handling, in spite of the fact that it is made from flexible films, laminates and adhesives.

In the illustrated embodiment, and as best shown in FIG. 3, the bottom laminate 12 is formed by lamination of a film 15 of polyvinylidene chloride, a film 16 of polyvinyl chloride, and a film 17 of polyvinylidene chloride. Top laminate 11 is a mirror image of laminate 12, and includes film 15 of polyvinylidene chloride, film 16 of polyvinyl chloride, and film 17 of polyvinylidene chloride. Outer films 15, 15' may be selected to maximize oxygen barrier character, and inner films 17, 17' may be chosen for maximum softness and flexibility. A suitable oxygen barrier polyvinylidene chloride film may have the composition of approximately 85% vinylidene chloride and 15% vinyl chloride, copolymerized. A suitable flexible film of polyvinylidene chloride may be prepared from a copolymer of 68% vinylidene chloride and 32% vinyl chloride.

Laminates 11 and 12 are formed from polyvinylidene chloride film (e.g., saran) in super-cooled state. Laminates 11 and 12 are maintained in the super-cooled state while strip 20 of an adhesive coating is applied to a top surface margin of bottom laminate 12. In this illustrated embodiment any suitable pressure-sensitive adhesive may be used, the matter of application of such adhesive as a coating being well known. However the adhesive is preferably not applied in solution form. Even though adhesive application and solvent removal may be attended to in a relatively short time, amorphous saran is very solvent sensitive. It is difficult to remove solvent without incurring substantial risk of solvent attack and crystallization of the saran film. Hence it is preferred that low-solvent or non-solvent "hot melt" adhesives be applied along strip 20. A specific preferred method will be described in detail hereinafter.

Following application of the strip of adhesive coating 20 to bottom laminate 12, products 13 are placed between the top and bottom laminates and suitable means are used to seal off the product area and evacuate this area between the laminates 11 and 12. During evacuation, the laminates are drawn into intimate contour-conforming relation with the product 13 and the peripheral edge seal is automatically formed where laminates 11 and 12 meet. In forming the package 10 there is adequate adherence between the various films which are combined to form the top and bottom laminates. The combined films of these laminates each contribute certain characteristics which provide for an overall package of adequate flexibility, toughness, and oxygen impermeability. Flexibility aids in the forming of the package and further prevents subsequent handling breakage.

The seal formed through adhesive strip 20 can be readily separated by peeling apart the top and bottom laminate to thus gain access into the package. Separation of the laminates does not result in the loss of adequate reclosing properties to prevent effective reclosing of the package. Reclosing characteristics are quite important even though the package is not resealable in any cohesive, or hermetic way. It is reclosable however and will prevent moisture loss. It is felt that once the package is opened, and oxygen admitted, resealing will not materially alter the effects of oxygen except where the film remains in intimate contact with the product. Furthermore upon reclosing, no continuous supply of fresh oxygen bearing air is available to the product within the package. Any suitable means, such as tabs 18, 18' formed of strips of paper, for example, may be used at the marginal edge of the seal area to facilitate ready separation of the top and bottom laminates for access into the package.

In the illustrated embodiment films 17, 17', upon being drawn together in the radially extending flange portion, generally 22, adhere to each other, forming an integrated permanent hermetic seal, except along that strip 20 in which the amorphous polyvinylidene chloride films are separated by the adhesive. Thus, in the illustrated embodiment, because of the natural or inherent cohesion between opposing faces of films 17, 17' and due to the fact that amorphous polyvinylidene films will fuse together at room temperature upon direct contact for substantial periods, it is unnecessary to provide permanent bonding adhesive, or processing steps (e.g., heating to slightly above the temperature of fusion) in order to provide a permanent hermetic seal in region 24, i.e., in the entirety of peripheral seal 22 other than the portion of 22 affected by adhesive strip 20.

It is necessary that the adhesive and/or films of packaging material from which the package of this invention is made be selected from those materials which are flexible, and which conform to each other's shape, in order to provide a package which exhibits no capillary leakage at the boundary between contiguous permanent and releasable seal regions.

As will be explained more fully hereinafter, it is within this invention to utilize either cold-formable laminates, cold-formable peel-seal combinations of laminates, heat sealable plastic laminates, i.e., polyethylene, polyvinyl chloride, etc., as the opposing sheets of plastic which enclose the product and form the dual hermetic seal in accordance with this invention. The particular method for achieving the permanent hermetic seal in region 24 will, of course, depend on the physical and chemical characteristics of the inner seal-forming laminae.

FIGS. 5 through 10 illustrate a preferred method and apparatus for manufacturing film-product packages in accordance with this invention. FIG. 5 illustrates the operating station sequence which is provided in accordance with a preferred embodiment of the method of this invention. A bank of extruders, generally 24, are schematically illustrated, and include polyvinylidene chloride extruders 25, 25', polyvinyl chloride extruders 26, 26' and polyvinylidene chloride extruders 27, 27'. Continuous sheets of extrudate passing from respective extruders are immediately passed into cooling bath 28 which contains water, generally maintained at a temperature of from 35° F. to 100° F. The individual sheets are passed between lamination rollers 30, 30', and the resulting laminations 11', 12', are passed around guide rollers 32, 32', 33, 33'. Lower lamination 12' passes from guide roller 33' to adhesive applicator, generally 42. Adhesive strip 20 is applied to lower web 12' along an inner margin thereof by any known means, e.g., by applicator wheel 40. Adhesive is picked up by the surface of applicator wheel 40 by known means and excess adhesive is removed therefrom by doctor blade 44. This method of application uniformly meters the proper amount of adhesive.

A pair of paper strips 18, 18' are continuously fed from rolls 46, 46' and against web 12' and 11', respectively, by laminating rollers 48, 48'. In accordance with known means paper strips 18, 18' may be inherently adherent to laminations 11', 12', or alternatively may be adhered thereto by suitable adhesive means.

The package forming unit 35 can be the known type (e.g., see U.S. Pat. 3,083,106, the disclosure of which is incorporated herein by reference). In package forming unit 35 articles of product 50 are placed between sheets 11', 12', and sheets 11', 12' are drawn around product 50, are shaped thereby, and are brought into sealing relationship around the perpiphery thereof. A continuous web 52 passes from package forming unit 35, the web having product 50 packaged therein at spaced apart intervals between laminations 11', 12'. The intervals conform to the distance between lower die elements 55 along conveyor chain 57. Conveyor chain 57 is driven by known means. The transverse movement of lower die elements 55 are governed and indexed to move in mating relationship with upper die elements 59 which are carried on upper conveyor 61. After a brief heat-treatment step, which will be described in further detail hereinafter, upper and lower die elements 59, 55, separate, leaving web 52, supported and conveyed by lower die elements 55 through labeling and trimming unit 64. In unit 64, web 52 is perforated around the periphery of radial flange 22, thereby separating film-product packages 10 from perforated web 66 which is then continuously wound on roll 68. Products 10 are discharged from lower die unit 55 onto conveyor 70 for removal to a packaging station which does not constitute part of the present invention, and is therefore not shown.

Even though in the preferred illustrated package embodiment described in detail hereinbefore it is unnecessary to provide sufficient heat to raise the temperature of the opposing inner faces 17, 17' (see FIG. 1) to a temperature above their point of fusion in order to achieve a hermetic seal, it is nonetheless desirable to provide sufficient heat in permanent hermetic seal region 24 to initiate and assist in the crystallization of the polyvinylidene chloride films. This is preferably achieved, in accordance with the illustrated embodiment, by use of heated upper and lower die members 55, 59. Heat may be externally applied, e.g., by optional heaters 71. It is to be understood however that die members 55, 59 can also be used to achieve a fused heat seal in those embodiments of this invention in which inner laminae 17, 17' are selected from those films requiring elevation of temperature in order to develop a hermetic seal.

FIGS. 5 through 10 illustrate in detail a preferred construction of die member 59. Lower die member 55 may be provided with internal heating means which are described in detail below, if desired.

Upper die member 59 includes a top cover 72 with skirts 74 peripherally dependent therefrom. Dependent skirts 74 include relatively narrow portion 76 and wider portion 78. It will be appreciated from a consideration of FIG. 5 that relatively wide portion 78 has the general configuration of a U. Member 59 includes connectors 80, 81, the function of which will be described hereinafter, and pivotal support means 83, 84. Axle means (not shown) can be of conventional construction and would be passed through openings 85, 85 and pivotally connect members 59 to upper conveyor 61. A substantially identical system connects members 55 to lower conveyor.

In the following description the term "axial" indicates the direction parallel to the relatively elongated dimension of the web 52, and "transverse" indicates a direction normal to the axial direction, i.e., the direction across web 52.

Member 59 is fitted with liquid conduit 87 which is hydraulically connected to connectors 80, 81. High temperature heat exchanger medium, e.g., steam, hot water, or other suitable liquid, is conveyed to and from member 59 by means of hydraulic lines 89. It will be appreciated from a consideration of FIG. 7 that heating conduit 87 passes horizontally transversely through member 59 a short distance and thence downwardly and axially into enlarged portion 78. Heating conduit 87 passes along the entire U-shaped widened portion 78 completely around recess 91 which confines products 13.

Consequently U-shaped widened portion 78 of dependent skirt 74 is efficiently heated because of the passage of conduit 87 therethrough. When members 59, 55 are pressed together, with opposing laminations 11, 12 therebetween, as illustrated in FIGS. 7 through 10, heat from U-shaped face 93 raises the temperature of radial flange portion 24, and, preferably, an adjacent portion of strip 20. "Upper" edges 95 of U-shaped face 93, as perhaps best appreciated from a consideration of FIG. 8 extend a short distance into strip 20. This assures proper heat treatment of the enitrety of zone 24, effectively merging zones 24 and strips 20 in the region of upper edges 95 rather than generating a distinct line of separation. Thus, the overlap of heating face 93 into zone 20, and the extent thereof, can be controlled by controlling the width of adhesive strip 20.

It will be appreciated that lower lamina 12 can be replaced by any suitable baseboard, e.g., a relatively rigid material such as flat, bleached kraft paperboard having a thickness of from .01 to 0.020 inch. These baseboards are well known in the art, and preferably include a bottom surface having a coating of microcrystalline paraffin wax for protection and at least partial sealing of the baseboard. The top surface of such a baseboard, replacing lower lamina 12 may have applied thereto a continuous suitable oxygen barrier material such as aluminum foil. The oxygen barrier material in the form of aluminum foil or the like is secured by adhesive or glue to the glazed baseboard and a suitable hot melt adhesive inner face coating is applied to the outer top surface of the oxygen barrier material for sealing coaction with the packaging film 17' in accordance with this invention. Alternatively, the top film on such a baseboard is a laminate having an upper outer face of super cooled polyvinylidene chloride, and in all respects, such an alternative lower product-supporting member is processed as lower web 12 is processed, in accordance with the foregoing description, except that, because of the inherent stiffness of the baseboard material, upper lamination 11 must be drawn down around the entire product to engage that portion of the baseboard which is peripheral to product 13.

Pressure sensitive adhesives used in accordance with this invention include, for example: plasticized polyisobutylene; colloidal solutions of polyvinyl ether, glycerine ester of hydrogenated rosin and 2,5-di-tert-amylhydroquinone in a petroleum naphtha base; polyethylene-vinyl acetate copolymers; and ethyl cellulose plasticized with plasticizers such as diphenyl-2-ethylhexyl phosphate, dibutyl sebacate, diisobutyl adipate or acetyl tributyl citrates. In packages where the adhesive is so located as to possibly come into contact with food products enclosed by the package, the adhesive used must be non-toxic and preferably fat insoluble. Such an adhesive is available under the trade designation of "Pyroxylin 18–274–18" which is composed of polyamides, polyester plasticizers and polymerized castor oils. An adhesive of this type may be diluted for application with a mixture of aromatic solvent and aliphatic alcohol.

As indicated above, the abutting of cohesive inner faces of laminations which spontaneously cohere and eventually coalesce into a homogeneous continuous layer makes the application of heat, e.g., by face 93, unnecessary. Thus, the bringing together of two plies of amorphous saran brings about such a hermetic seal. These and other useful film, adhesive, and sealing combinations are set forth in the table below.

| Method | Film | Adhesive |
| --- | --- | --- |
| 1. Atmospheric pressure | Cold-formable, amorphous saran laminate. | Pressure sensitive. |
| 2. Warm (150–200° F.) U shaped sealing bar. | Cold-formable, saran, peel-seal laminates. | Hot melt. |
| 3. Hot 200–400° F. U shaped sealing bar. | Heat sealable plastic laminates, i.e., polyethylene, PVC, etc. | Thermally-activated adhesive. |

Another method of fabricating the package of this invention comprises utilizing a sheet of an ethylene-polar monomer copolymer as one of the inner lamina to provide one of the inner sealing faces, and using a sheet of thermoplastic material to provide an inner surface, the other seal forming face. In this embodiment the ethylene-polar monomer copolymer can include between 10 and 40% polar monomer polymerized therein, more preferably 15 to 20% by weight. The polar monomer is most preferably selected from the mono-ethylenically unsaturated esters such as vinyl acetates, isobutyl acrylate and ethyl acrylate. The opposing face is preferably selected from polyvinylidene chloride-vinyl chloride copolymer, e.g., one polymerized from 85% vinylidene chloride and 15% vinyl chloride, or, for example, a copolymer prepared from an intimate admixture of 68% vinylidene chloride and 32% vinyl chloride. The precise ratio between vinylidene chloride and vinyl chloride in the vinylidene chloride copolymer is not critical, and a relatively wide range of options provide a relatively wide range of seal characteristics. In accordance with this particular preferred embodiment, opposing faces of the sheets are brought together around an article to form two contiguous seal regions.

Heat is not necessary to form the permanent seal region if the surfaces brought together in that region are amorphous saran. Alternatively the permanently sealed region may be heated to a temperature at least slightly above the fusion temperature of the materials making up the seal, e.g., 200° F. and the releasable region is simply subjected to pressure at ambient temperature, or, for an improved, enhanced, stronger but releasable peelable seal area, the latter described region is preferably heated to a temperature below the fusion temperature of the materials making up the seal forming faces. Such peelable seals are disclosed in our copending U.S. patent application Ser. No. 754,361, filed Aug. 21, 1968, the disclosure of which is incorporated herein by reference thereto.

Thus, in accordance with this invention, the seal of area 24 is an unpeelable seal, e.g., a film-to-film seal, and the hermetic seal in zone 20 is peelable.

It will be appreciated that peelable zone 20 can be opened by pulling strips 18, 18' away from each other. It is further noted that zone 20 extends a substantial distance into that portion of package 10 which actually encompasses product 13. Thus, separation of layers 11, 12, in the peelable zone 20 allows access to product 13 in package 10. Furthermore, because zone 24 is permanently, unpeelably bonded, the relative orientation and configuration of layers 11, 12, is held fixed, thus facilitating removal of a few articles, e.g., weiners while leaving the remaining articles in virtually perfect seating relationship with laminations 11, 12. Packages 10 can then be reclosed by merely bringing laminae 11, 12, in the region of zone 20, together again.

The foregoing examples are for illustrative purposes only, and the scope of the invention is to be limited only in accordance with the following claims.

We claim:
1. A continuous method of enclosing a product between a pair of films to provide a film-package having a product-enclosing portion and a peripheral flange, a portion of said films being readily separated when access to the product is desired, the method comprising the steps: moving said pair of films spaced-apart and face-to-face along a line, said films including means for permanently bonding opposing faces thereof to each other; applying near a marginal edge of one of the films a continuous strip of peelable-bond adhesive, said strip extending through that portion of the film destined to become a peripheral flange of said package, and extending at least part way into that portion of the film destined to become the product-enclosing portion with at least some of said opposing faces destined to become a peripheral flange of said package remaining free of said adhesive; attaching continuous tab means for maintaining the pairs of film in separated condition in a zone between said strip and a portion of the film destined to become a portion of an exposed lateral edge of said flange; moving a product between said pair of films; drawing the films around the product to bring the films into contact with each other around the periphery of the product; bonding the films together around the periphery of the product, whereby a permanent, non-peelable bond is generated around a portion of that periphery, the remaining portion of the periphery in the region of the strip of adhesive, providing a peelable bond.

2. The method of claim 1 in which the opposing faces of said films are layers of amorphous polyvinylidene chloridevinyl chloride copolymer.

3. The method of claim 1 in which the opposing faces of the films are layers of saran.

4. The method of claim 1 in which the opposing faces of said films include layers of heat sealable plastic and in which said bonding step includes heating the opposing faces to a temperature at least slightly above the temperature of fusion of one of said layers.

5. The method of claim 1 in which said bonding step includes heating a zone around the periphery of the package which extends continuously from the adhesive zone on one side of the package, around the flange portion at which no adhesive is added, to the adhesive zone on the other side of the package, said zone extending slightly into the adhesive-treated areas at both ends of the heated zone.

6. The method of claim 1 in which the pair of films comprises an inner face of cold-formable amorphorus saran, and in which the adhesive is a pressure sensitive adhesive.

7. The method of claim 1 in which the pair of films include an inner face of cold-formable saran, and in which the adhesive is a hot melt adhesive, and in which the permanent non-peelable bond is generated by the application of pressure to the permanently bonded portion.

8. The method of claim 1 in which the opposing seal-forming faces of said pair of films is selected from materials which are heat sealable, and in which the adhesive is a thermally activated adhesive, and in which the seal-forming region is subjected to an elevated temperature in the range 200–400° F.

References Cited

UNITED STATES PATENTS

| 2,232,783 | 2/1941 | Hausheen | 53—14 X |
| 2,354,590 | 7/1944 | Gilfillan | 99—171 LP |
| 2,525,651 | 10/1950 | Clunan | 99—171 S |
| 2,672,268 | 3/1954 | Bower | 99—171 S |
| 2,691,856 | 10/1954 | Jensen | 53—14 X |
| 2,834,686 | 5/1958 | Reuman | 99—171 LP |
| 2,836,291 | 8/1958 | Stroop | 99—171 LP |
| 3,131,069 | 2/1964 | Goller | 99—174 |
| 3,137,580 | 6/1964 | Sloan | 99—174 X |
| 3,272,422 | 9/1966 | Miller | 99—171 C |
| 3,278,109 | 10/1966 | Solway | 229—51 WB |
| 3,330,670 | 7/1967 | Grindrod | 99—174 X |
| 3,343,661 | 9/1967 | Nugarus | 99—174 X |
| 3,371,848 | 3/1968 | Ward | 99—174 X |
| 3,445,324 | 5/1969 | Curler | 99—171 LP |
| 3,438,483 | 4/1969 | Miller | 99—174 X |
| 3,491,935 | 1/1970 | Trotter | 229—51 WB |
| 3,220,966 | 11/1965 | Flanagan | 99—174 UX |

FRANK W. LUTTER, Primary Examiner

R. HALPER, Assistant Examiner

U.S. Cl. X.R.

53—14; 156—289; 229—51 SC; 99—171 LP

UNITED STATES PATENT OFFICE
CERTIFICATE OF CORRECTION

Patent No. 3,740,237      Dated June 19, 1973

Inventor(s): Paul E. Grindrod, Harry L. Radloff, Robert L. Goller, Oscar E. Seiferth It is certified that error appears in the above-identified patent and that said Letters Patent are hereby corrected as shown below:

Column 1, line 35, after "product" insert --enclosed therebetween.--

Column 6, line 1, "enitrety" should be --entirety--

Signed and sealed this 25th day of December 1973.

(SEAL)
Attest:

EDWARD M. FLETCHER, JR.
Attesting Officer

RENE D. TEGTMEYER
Acting Commissioner of Patents